US012634128B2

(12) United States Patent
Hou et al.

(10) Patent No.: US 12,634,128 B2
(45) Date of Patent: May 19, 2026

(54) KEY MANAGEMENT METHOD AND RELATED DEVICE

(71) Applicant: Alipay (Hangzhou) Information Technology Co., Ltd., Hangzhou (CN)

(72) Inventors: Weixing Hou, Hangzhou (CN); Wei An, Hangzhou (CN); Lei Hu, Hangzhou (CN); Chao Li, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 78 days.

(21) Appl. No.: 18/824,228

(22) Filed: Sep. 4, 2024

(65) Prior Publication Data

US 2025/0080345 A1 Mar. 6, 2025

(30) Foreign Application Priority Data

Sep. 6, 2023 (CN) .......................... 202311148102.3

(51) Int. Cl.
 *H04L 9/08* (2006.01)
 *H04L 9/14* (2006.01)
(52) U.S. Cl.
 CPC .......... *H04L 9/0894* (2013.01); *H04L 9/0822* (2013.01); *H04L 9/14* (2013.01); *H04L 9/08* (2013.01); *H04L 9/0819* (2013.01)
(58) Field of Classification Search
 CPC ....... H04L 9/0894; H04L 9/0822; H04L 9/14; H04L 9/08; H04L 9/0819
 USPC ......................................................... 380/278
 See application file for complete search history.

(56) References Cited

U.S. PATENT DOCUMENTS

| | | | | | |
|---|---|---|---|---|---|
| 6,125,185 | A | * | 9/2000 | Boesch ................ | H04L 9/0825 |
| | | | | | 713/170 |
| 8,312,559 | B2 | * | 11/2012 | Walrath ............. | H04W 12/065 |
| | | | | | 726/20 |
| 9,064,135 | B1 | * | 6/2015 | Poo .......................... | G06F 21/72 |
| 2002/0016917 | A1 | * | 2/2002 | Kitamura ............... | G06F 21/75 |
| | | | | | 713/189 |
| 2003/0182566 | A1 | * | 9/2003 | Kohara ................. | H04L 9/0894 |
| | | | | | 713/193 |
| 2016/0232109 | A1 | * | 8/2016 | Canter .................. | G06F 3/0623 |
| 2018/0165455 | A1 | * | 6/2018 | Liguori .................. | G06F 21/57 |
| 2020/0099815 | A1 | * | 3/2020 | Ono ..................... | G06F 13/4282 |
| 2020/0186340 | A1 | * | 6/2020 | Du ........................ | H04L 9/3239 |
| 2020/0274699 | A1 | * | 8/2020 | Watson ................. | H04L 9/3249 |

(Continued)

*Primary Examiner* — Thanh T Le

(74) *Attorney, Agent, or Firm* — Womble Bond Dickinson (US) LLP

(57) ABSTRACT

This specification provides a key management method and a related device, which are applied to security hardware. The method includes: preventing, in response to a start instruction for the electronic device, the CPU from being started, and encrypting a second key corresponding to the security hardware by using the stored first key; sending an encrypted second key to the storage medium, so that the storage medium decrypts the encrypted second key by using the first key, and stores a decrypted second key, where the second key is stored in volatile storage space of the storage medium, and the second key is used to encrypt data when the data is written into the storage medium, and decrypt data when the data is read; and controlling, in response to that the storage medium successfully stores the second key, the CPU to be started.

20 Claims, 4 Drawing Sheets

Prevent, in response to a start instruction for an electronic device, a CPU from being started, and encrypt a second key corresponding to security hardware by using a stored first key — S201

Send an encrypted second key to a storage medium, so that the storage medium decrypts the encrypted second key by using the stored first key, and stores a decrypted second key, where the second key is stored in volatile storage space of the storage medium, and the second key is used to encrypt data when the data is written into the storage medium, and decrypt data when the data is read from the storage medium — S202

Control, in response to that the storage medium successfully stores the second key, the CPU to be started — S203

(56)                 References Cited

U.S. PATENT DOCUMENTS

| 2020/0356285 | A1* | 11/2020 | Pan | G06F 3/0658 |
| 2021/0144141 | A1* | 5/2021 | Lee | H04L 9/0897 |
| 2022/0027476 | A1* | 1/2022 | Raghuram | H04L 9/0894 |
| 2022/0283714 | A1* | 9/2022 | Lee | G06F 3/0622 |
| 2023/0254127 | A1* | 8/2023 | Bernat | H04L 9/0897 |
| | | | | 713/171 |

\* cited by examiner

Electronic device 10

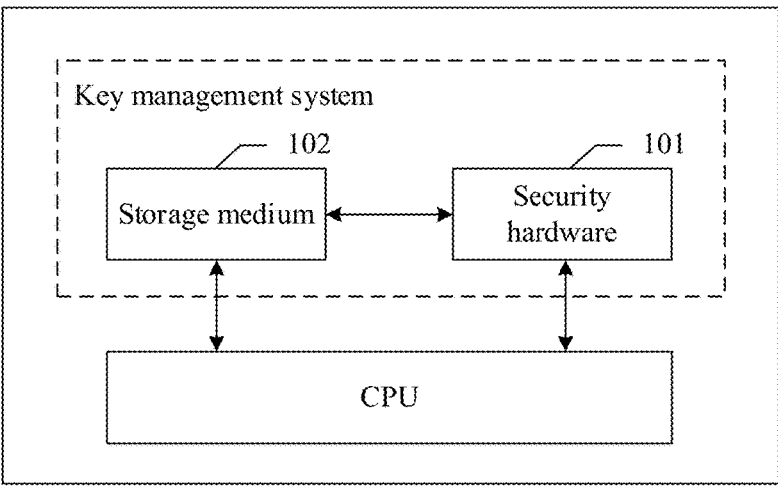

FIG. 1

Prevent, in response to a start instruction for an electronic device, a CPU from being started, and encrypt a second key corresponding to security hardware by using a stored first key — S201

Send an encrypted second key to a storage medium, so that the storage medium decrypts the encrypted second key by using the stored first key, and stores a decrypted second key, where the second key is stored in volatile storage space of the storage medium, and the second key is used to encrypt data when the data is written into the storage medium, and decrypt data when the data is read from the storage medium — S202

Control, in response to that the storage medium successfully stores the second key, the CPU to be started — S203

FIG. 2

KEY MANAGEMENT METHOD AND RELATED DEVICE

TECHNICAL FIELD

One or more embodiments of this specification relate to the field of key management technologies, and in particular, to a key management method and a related device.

BACKGROUND

To protect data storage security, disk encryption of software is a relatively common encryption manner in which encryption management can be performed on data on a hard disk by using various software programs. For example, when a user wants to write data into the hard disk, the software program first encrypts the data by using a key, and then actually writes encrypted data into the hard disk. Correspondingly, when the user wants to read data from the hard disk, the software program decrypts the data by using the key, and then provides decrypted data to the user.

The key used to perform data encryption management is usually generated and managed by the software, and the software often faces a security attack during running. Therefore, the key is very susceptible to leakage, and data security cannot be ensured.

SUMMARY

In view of this, one or more embodiments of this specification provide a key management method and a related device.

According to a first aspect, this specification provides a key management method, applied to security hardware that is mounted in an electronic device and that serves as a root of trust of the electronic device. The security hardware is separately connected to a storage medium and a central processing unit (CPU) in the electronic device, and the storage medium and the security hardware store a first key. The method includes:

preventing, in response to a start instruction for the electronic device, the CPU from being started, and encrypting a second key corresponding to the security hardware by using the stored first key;

sending an encrypted second key to the storage medium, so that the storage medium decrypts the encrypted second key by using the stored first key, and stores a decrypted second key, wherein the second key is stored in volatile storage space of the storage medium, and the second key is used to encrypt data when the data is written into the storage medium, and decrypt data when the data is read from the storage medium; and controlling, in response to that the storage medium successfully stores the second key, the CPU to be started.

According to a second aspect, this specification provides a key management method, applied to a storage medium in an electronic device. Security hardware serving as root of trust of the electronic device is mounted in the electronic device, the security hardware is separately connected to the storage medium and a central processing unit (CPU) in the electronic device, and the storage medium and the security hardware store a first key. The method includes:

receiving, after the security hardware prevents, in response to a start instruction for the electronic device, the CPU from being started, and encrypts a second key corresponding to the security hardware by using the stored first key, an encrypted second key sent by the security hardware;

decrypting the encrypted second key by using the stored first key, and storing a decrypted second key, so that the security hardware controls, in response to that the storage medium successfully stores the second key, the CPU to be started, where the second key is stored in volatile storage space of the storage medium; and encrypting data when the data is written into the storage medium, and decrypting data when the data is read from the storage medium, by using the stored second key.

According to a third aspect, this specification provides a key management apparatus, applied to security hardware that is mounted in an electronic device and that serves as a root of trust of the electronic device. The security hardware is separately connected to a storage medium and a central processing unit (CPU) in the electronic device, and the storage medium and the security hardware store a first key. The apparatus includes:

a key encryption unit, configured to prevent, in response to a start instruction for the electronic device, the CPU from being started, and encrypt a second key corresponding to the security hardware by using the stored first key;

a key transmission unit, configured to send an encrypted second key to the storage medium, so that the storage medium decrypts the encrypted second key by using the stored first key, and stores a decrypted second key, where the second key is stored in volatile storage space of the storage medium, and the second key is used to encrypt data when the data is written into the storage medium, and decrypt data when the data is read from the storage medium; and a CPU start unit, configured to control, in response to that the storage medium successfully stores the second key, the CPU to be started.

According to a fourth aspect, this specification provides a key management apparatus, applied to a storage medium in an electronic device. Security hardware serving as a root of trust of the electronic device is mounted in the electronic device, the security hardware is separately connected to the storage medium and a central processing unit (CPU) in the electronic device, and the storage medium and the security hardware store a first key. The apparatus includes:

a key receiving unit, configured to receive, after the security hardware prevents, in response to a start instruction for the electronic device, the CPU from being started, and encrypts a second key corresponding to the security hardware by using the stored first key, an encrypted second key sent by the security hardware;

a key storage unit, configured to decrypt the encrypted second key by using the stored first key, and store a decrypted second key, so that the security hardware controls, in response to that the storage medium successfully stores the second key, the CPU to be started, where the second key is stored in volatile storage space of the storage medium; and a data encryption management unit, configured to encrypt data when the data is written into the storage medium, and decrypt data when the data is read from the storage medium, by using the stored second key.

According to a fifth aspect, this specification provides a key management system. The system includes a storage medium in an electronic device and security hardware serving as a root of trust of the electronic device. The security hardware is separately connected to the storage medium and a central processing unit (CPU) in the electronic device, and the storage medium and the security hardware store a first key.

The security hardware is configured to prevent, in response to a start instruction for the electronic device, the CPU from being started, and encrypt a second key corresponding to the security hardware by using the stored first key; and send an encrypted second key to the storage medium.

The storage medium is configured to decrypt the encrypted second key by using the stored first key, and store a decrypted second key, where the second key is stored in volatile storage space of the storage medium.

The security hardware is further configured to control, in response to that the storage medium successfully stores the second key, the CPU to be started.

The storage medium is further configured to encrypt data when the data is written into the storage medium, and decrypt data when the data is read from the storage medium, by using the stored second key.

Correspondingly, this specification further provides an electronic device, including a storage and a processor. The storage stores a computer program capable of being run by the processor, and when the processor runs the computer program, the key management method according to the first aspect is performed, or the key management method according to the second aspect is performed.

Correspondingly, this specification further provides a non-transitory computer-readable storage medium. The non-transitory computer-readable storage medium stores a computer program, and when the computer program is run by a processor, the key management method according to the first aspect is performed, or the key management method according to the second aspect is performed.

In conclusion, the security hardware serving as the root of trust of the electronic device in this specification is mounted in the electronic device, and the security hardware is connected to the storage medium and the CPU in the electronic device. In addition, both the security chip and the storage medium store the first key. The security hardware can prevent, in response to the start instruction for the electronic device, the CPU from being started, and encrypt the second key corresponding to the security hardware by using the stored first key; and transmit the encrypted second key to the storage medium. Further, after receiving the encrypted second key, the storage medium can decrypt the encrypted second key by using the stored first key, and store the decrypted second key in the volatile storage space of the storage medium. After the storage medium successfully stores the second key, the security hardware controls the CPU to be started. Then, the storage medium can encrypt data when the data is written into the storage medium, and decrypt data when the data is read from the storage medium, by using the stored second key, to ensure data security. In this way, in this specification, an encryption key used for data encryption management is generated by using the root of trust security chip, and the encryption key is securely transmitted to the storage medium before the CPU is started, thereby implementing more secure key management and protection. In addition, because the encryption key is stored in the volatile storage space of the storage medium, once the electronic device is turned off or the storage medium is maliciously removed from the electronic device, the originally stored second key is lost as the storage medium is powered off, thereby effectively preventing key leakage and ensuring data storage security.

BRIEF DESCRIPTION OF DRAWINGS

The accompanying drawings herein are incorporated into the specification and constitute a part of the specification, illustrate embodiments that conform to this specification, and are used together with the specification to explain the principles of this specification.

FIG. 1 is a schematic diagram of an architecture of a key management system according to an example embodiment;

FIG. 2 is a schematic flowchart of a key management method according to an example embodiment;

DESCRIPTION OF EMBODIMENTS

Figure 3:
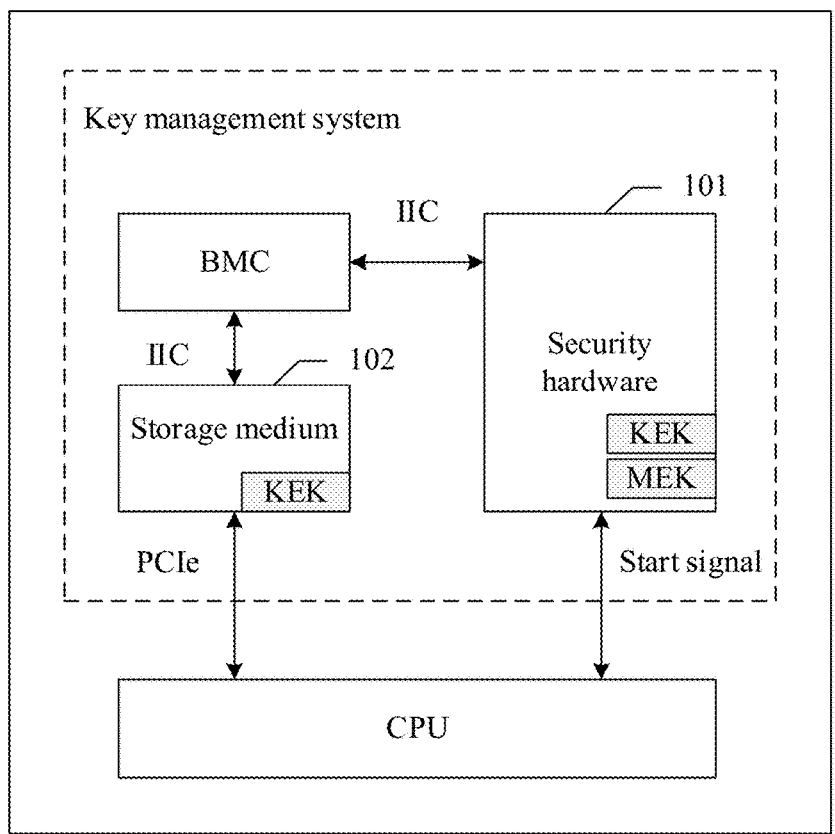
FIG. 3 is a schematic diagram of an architecture of another key management system according to an example embodiment.

Example embodiments are described in detail herein, and examples of the example embodiments are presented in the accompanying drawings. When the following descriptions relate to the accompanying drawings, unless specified otherwise, the same numbers in different accompanying drawings represent the same or similar elements. Implementations described in the following example embodiments do not represent all implementations consistent with one or more embodiments of this specification. On the contrary, the implementations are merely examples of apparatuses and methods that are described in the appended claims in detail and consistent with some aspects of one or more embodiments of this specification.

It should be noted that the steps of the corresponding method are not necessarily performed in the sequence shown and described in this specification in other embodiments. In some other embodiments, the method can include more or fewer steps than those described in this specification. In addition, a single step described in this specification may be decomposed into a plurality of steps in other embodiments for description; and a plurality of steps described in this specification may be combined into a single step for description in other embodiments.

It should be noted that "a plurality of" in this specification means two or more.

In addition, user information (including but not limited to user equipment information, personal user information, and the like) and data (including but not limited to data used for analysis, stored data, displayed data, and the like) in this specification are information and data that are authorized by a user or that are fully authorized by each party. Furthermore, related data needs to be collected, used, and processed in compliance with relevant laws, regulations and standards of relevant countries and regions, and corresponding operation entries are provided for the user to choose to authorize or reject.

Some terms in this specification are first explained and described, to facilitate understanding by a person skilled in the art.

A root of trust (ROT) is a basis to security of a computer system, and is intended to provide a trusted environment to the computer system. The root of trust establishes a trust chain. In the chain, every component in the computer system needs to undergo trusted measurement (or trusted verification) before being allowed to operate, and only components whose trusted measurement succeeds are allowed to perform corresponding operations, to guard against various security threats in the computer system, for example, malware, unauthorized access, and tampering with system data.

In addition, the root of trust is usually in a form of a security chip (or referred to as a root of trust chip), and for example, can be specifically a security chip based on a trusted platform module (TPM), a security chip based on a trusted cryptography module (TCM), a security chip based on a trusted platform control module (TPCM), and the like. This is not specifically limited in this specification.

As described above, to ensure data storage security, encryption management can be performed on data on a hard disk through disk encryption of software. For example, when a user wants to write data into the hard disk, a software program first encrypts the data by using a key, and then actually writes encrypted data into the hard disk. Correspondingly, when the user wants to read data from the hard disk, the software program decrypts the data by using the key, and then provides decrypted data to the user. However, the key used to perform data encryption management is usually generated and managed by the software, and the software often faces a security attack during running. Therefore, the key is very susceptible to leakage, and data security cannot be ensured.

Based on this, this specification provides a technical solution. Security hardware serving as a root of trust generates an encryption key, and securely transmits the encryption key to a storage medium before the CPU is started. Only after the storage medium successfully stores the encryption key, the CPU is started. Subsequently, the storage medium can perform, based on the encryption key, data encryption management on data stored in the storage medium. This greatly improves key management security, and ensures data storage security.

In implementation, the security hardware serving as the root of trust of an electronic device in this specification is mounted in the electronic device. The security hardware is separately connected to the storage medium and the CPU in the electronic device, and the storage medium and the security hardware store a first key. The security hardware prevents, in response to a start instruction for the electronic device, the CPU from being started, and encrypts a second key corresponding to the security hardware by using the stored first key. Further, the security hardware sends an encrypted second key to the storage medium. The storage medium can decrypt the encrypted second key by using the stored first key, and store a decrypted second key. The second key can be stored in volatile storage space of the storage medium. The second key can be used to encrypt data when the data is written into the storage medium, and decrypt data when the data is read from the storage medium. Further, the security hardware can control, in response to that the storage medium successfully stores the second key, the CPU to be started.

In the above-mentioned technical solution, the security hardware serving as the root of trust of the electronic device in this specification is mounted in the electronic device, and the security hardware is connected to the storage medium and the CPU in the electronic device. In addition, both the security chip and the storage medium store the first key. The security hardware can prevent, in response to the start instruction for the electronic device, the CPU from being started, and encrypt the second key corresponding to the security hardware by using the stored first key; and transmit the encrypted second key to the storage medium. Further, after receiving the encrypted second key, the storage medium can decrypt the encrypted second key by using the stored first key, and store the decrypted second key in the volatile storage space of the storage medium. After the storage medium successfully stores the second key, the security hardware controls the CPU to be started. Then, the storage medium can encrypt data when the data is written into the storage medium, and decrypt data when the data is read from the storage medium, by using the stored second key, to ensure data security. In this way, in this specification, an encryption key used for data encryption management is generated by using the root of trust security chip, and the encryption key is securely transmitted to the storage medium before the CPU is started, thereby implementing more secure key management and protection. In addition, because the encryption key is stored in the volatile storage space of the storage medium, once the electronic device is turned off or the storage medium is maliciously removed from the electronic device, the originally stored second key is lost as the storage medium is powered off, thereby effectively preventing key leakage and ensuring data storage security.

FIG. 1 is a schematic diagram of an architecture of a key management system according to an example embodiment. One or more embodiments provided in this specification can be specifically implemented in the system architecture shown in FIG. 1 or a similar system architecture. As shown in FIG. 1, an electronic device 10 can include a CPU and a key management system. Specifically, the key management system can include security hardware 101 and a storage medium 102. As shown in FIG. 1, the security hardware 101 is separately connected to the storage medium 102 and the CPU. Further, the storage medium 102 is connected to the CPU. It should be understood that when running various application programs, the CPU can write data into the storage medium 102 and read data from the storage medium 102.

In a shown implementation, the security hardware 101 can serve as a root of trust of the electronic device 10. In a shown implementation, the security hardware 101 can be a root of trust security chip. For example, the security hardware 101 can include any one of the following shown security chips: a security chip based on a trusted platform module (TPM), a security chip based on a trusted cryptography module (TCM), a security chip based on a trusted platform control module (TPCM), and the like. This is not specifically limited in this specification.

In a shown implementation, the storage medium 102 can be an encryption hard disk with a data encryption function. For example, the storage medium 102 can be a solid-state drive (SSD) with a data encryption function, or can be a removable solid-state drive. For example, the storage medium 102 can alternatively be a disk with a data encryption function, or the like. This is not specifically limited in this specification.

In a shown implementation, both the security hardware 101 and the storage medium 102 store a first key. For example, the first key can be set in the security hardware 101 and the storage medium 102 before delivery. In a shown implementation, the first key can be a key used to encrypt a key, that is, a key encryption key (KEK).

The KEK is usually configured to protect a symmetric key, for example, is configured to protect a session key used in network communication or a data encryption key used in a storage device. In addition, the KEK is usually a symmetric key. It should be noted that the KEK can implement encryption by using different encryption algorithms and key lengths. This is not specifically limited in this specification. For example, the KEK can encrypt another AES key by using an AES algorithm and a 256-bit key, thereby improving data security. In addition, to ensure security of the KEK in a use process and prevent unauthorized access and use, in some possible implementations, the KEK is usually used with other security measures, for example, access control, identity verification, and auditing. This is not specifically limited in this specification.

In a shown implementation, the security hardware 101 can prevent, in response to a start instruction for the electronic device 10, the CPU in the electronic device 10 from being started. For example, the start instruction can be a start instruction based on a turn-on operation or a restart operation.

Further, the security hardware 101 can generate a second key, and the second key can be used to perform data encryption management on data stored in the storage medium 102. It should be noted that a generation manner of the second key is not specifically limited in this specification. In a shown implementation, the security hardware 101 can directly generate the second key by using a random number algorithm. In a shown implementation, the security hardware 101 can alternatively generate the second key through key derivation. For example, the security hardware 101 can derive the second key based on the first key stored in the security hardware 101 or another key.

In a shown implementation, the second key can be a master encryption key (MEK). The MEK is an encryption key used to perform encryption management on data stored in an encryption device (for example, an SSD with an encryption function), including encryption and decryption of data (for example, files, application program data, and operating system data) stored in the device, to protect the data in the device from being accessed and stolen by an unauthorized visitor. The MEK is usually a symmetric key. It should be noted that similar to the KEK, the MEK can also implement encryption by using different encryption algorithms and key lengths, for example, an AES algorithm and a 256-bit key. Similarly, to ensure security of the MEK in a use process, the MEK is usually used with other security measures, for example, access control, identity verification, and a device encryption/decryption module. This is not specifically limited in this specification.

Further, after generating the second key, the security hardware 101 can encrypt the second key by using the first key stored in the security hardware 101.

In a shown implementation, the security hardware may not store the generated second key, or store the second key in volatile storage space of the security hardware. In this way, once the electronic device 10 is turned off or powered off, the second key in the security hardware 101 is lost, thereby effectively preventing key leakage. Correspondingly, the security hardware 101 can generate the second key again in response to each start instruction for the electronic device 10, that is, each time the electronic device is started, and encrypt the generated second key by using the first key stored in the security hardware 101. In a shown implementation, the security hardware 101 can generate the same second key each time.

In a shown implementation, after generating the second key, the security hardware 101 can store the second key, for example, store the second key in nonvolatile storage space of the security hardware. In this way, even if the electronic device 10 is subsequently turned off, the second key in the security hardware 101 is not lost. As the electronic device 10 is restarted, the security hardware 101 does not need to regenerate the second key, but can directly encrypt the stored second key by using the first key. For example, when the electronic device 10 is started for the first time, and the security hardware 101 generates the second key for the first time, the security hardware 101 can store the second key in the nonvolatile storage space.

In a shown implementation, the second key can be prestored in the security hardware 101, for example, prestored in non-volatile storage space of the security hardware. For example, the first key can be set in the security hardware 101 before delivery. Correspondingly, the security hardware 101 can prevent, in response to a start instruction for the electronic device 10, the CPU in the electronic device 10 from being started, and directly encrypt the stored second key by using the stored first key.

Further, the security hardware 101 sends an encrypted second key to the storage medium 102. Correspondingly, the storage medium 102 receives the encrypted second key, and decrypts the encrypted second key by using the first key stored in the storage medium 102, to obtain plaintext of the second key and store the plaintext.

It should be noted that the root of trust chip usually includes a secure storage area used to store an encryption key, other sensitive data, and the like. The secure storage area can include the nonvolatile storage space and the volatile storage space of the security hardware. In addition, the storage medium 102 (for example, an SSD) can also include volatile storage space, for example, a random access memory (RAM). In this specification, the plaintext of the second key can be stored only in the secure storage area of the root of trust chip and the RAM of the storage medium 102. In this way, once the electronic device 10 is turned off or the storage medium 102 is maliciously removed from the electronic device 10, the second key originally stored in the storage medium 102 is lost as the storage medium 102 is powered off, thereby effectively preventing key leakage.

Further, the security hardware 101 can control, in response to that the storage medium 102 successfully stores the second key, the CPU to be started.

In a shown implementation, after the CPU is started, the CPU can exchange data with the storage medium 102. In this case, the storage medium 102 can perform data encryption management based on the stored second key.

Alternatively, in a shown implementation, in a start process of the CPU, the CPU can exchange data with the storage medium 102. In this case, the storage medium 102 can perform data encryption management based on the stored second key.

As described above, when and after the CPU is started, the CPU may exchange data with the storage medium 102. When the CPU exchanges data with the storage medium 102, the storage medium 102 can perform data encryption management based on the stored second key.

For example, the storage medium 102 can encrypt, by using the second key, data written into the storage medium 102 by the CPU, and/or decrypt, by using the second key, data read from the storage medium 102 by the CPU, to ensure data storage security.

In a shown implementation, the electronic device 10 can be a smartphone, a smart wearable device, a tablet computer, a laptop computer, a desktop computer, a server, a server cluster including several servers, or the like in which the key management system and the CPU are mounted. This is not specifically limited in this specification.

In addition, it should be noted that the system architecture shown in FIG. 1 is merely used as an example for description. In some possible implementations, the key management system can include more or fewer parts than those in FIG. 1. This is not specifically limited in this specification.

FIG. 2 is a schematic flowchart of a key management method according to an example embodiment. The method can be applied to the key management system shown in FIG. 1, and can be specifically applied to security hardware in the key management system. As shown in FIG. 2, the method can specifically include the following steps S201 to S203.

Step S201: Prevent, in response to a start instruction for an electronic device, a CPU from being started, and encrypt a second key corresponding to the security hardware by using a stored first key.

As described above, the security hardware serving as a root of trust of the electronic device is mounted in the electronic device. The security hardware is separately connected to a storage medium and the CPU in the electronic device, and both the security hardware and the storage medium store the first key.

In a shown implementation, the security hardware can prevent, in response to the start instruction for the electronic device, the CPU in the electronic device from being started.

Further, when the CPU is in an unstarted state, the security hardware can further generate the second key, and encrypt the second key by using the stored first key.

In a shown implementation, after the electronic device is started, the storage medium is powered on, and sends a key obtaining request to the security hardware. Correspondingly, the security hardware receives the key obtaining request. In response to the request, the security hardware can generate the second key, and encrypt the second key by using the stored first key. For specific types of the first key and the second key and a generation manner of the second key, refer to the descriptions in the embodiment corresponding to FIG. 1. Details are not described herein again.

In a shown implementation, the security hardware can further store the second key. For example, the second key can be set in the security hardware before delivery, or the second key is stored after the second key is generated for the first time. For details, refer to the descriptions in the embodiment corresponding to FIG. 1. Details are not described herein again. In this way, after receiving the key obtaining request, the security hardware can directly encrypt, in response to the request, the stored second key by using the stored first key.

FIG. 3 is a schematic diagram of an architecture of another key management system according to an example embodiment. As shown in FIG. 3, the key management system can further include a baseboard management controller (BMC), and the BMC is separately connected to the security hardware and the storage medium. In a shown implementation, all of the CPU, the BMC, the security hardware, and the storage medium shown in FIG. 3 can be disposed on a main board of the electronic device. The main board is powered on in response to the start instruction for the electronic device. Correspondingly, the BMC, the security hardware, and the storage medium on the main board are powered on. In addition, the security hardware can prevent, in a timely manner based on a start control mechanism of a TPCM function for the CPU, the CPU from being started, that is, control the CPU to be in the unstarted state.

In a shown implementation, a power-on voltage domain of the main board usually can be 3.3 V. This is not specifically limited in this specification.

In a shown implementation, that the security hardware prevents the CPU from being started can specifically include: After the main board is powered on, the security hardware generates a start signal (that is, a CPU reset signal) for the CPU, and blocks a sending procedure of the start signal for the CPU, to prevent the CPU from being started. Further, when the security hardware controls the CPU to be in the unstarted state, the security hardware can first perform trusted verification on firmware mounted in the electronic device. In response to that the trusted verification succeeds, the firmware can be enabled for running. In this case, the security hardware can still continuously block the sending procedure of the start signal for the CPU, to maintain the CPU in the unstarted state.

In a shown implementation, the firmware can include a basic input/output system (BIOS), a BMC, and the like. This is not specifically limited in this specification.

In a shown implementation, the security hardware can regenerate the start signal for the CPU in response to that the trusted verification succeeds, and block the sending procedure of the start signal for the CPU, to control the CPU to be in the unstarted state, and so on. This is not specifically limited in this specification.

Further, when the security hardware controls the CPU to be in the unstarted state, the BMC can be started in response to that trusted verification performed by the security hardware on the BMC succeeds. In a shown implementation, after being powered on, the storage medium can send a key obtaining request to the BMC, and the BMC receives the key obtaining request, and further sends the key obtaining request to the security hardware. Correspondingly, the security hardware receives the key obtaining request, generates the second key in response to the request, and encrypts the second key by using the stored first key. Alternatively, when the security hardware stores the second key, the security hardware can directly encrypt, in response to the request, the stored second key by using the stored first key. As shown in FIG. 3, the first key can be a KEK, and the second key can be a MEK.

In addition, it should be noted that a communication manner between the BMC and each of the security hardware and the storage medium is not specifically limited in this specification. In a shown implementation, as shown in FIG. 3, the BMC can separately communicate with the security hardware and the storage medium by using an inter-integrated circuit (IIC) communication protocol, or the BMC can communicate by using any other possible communication protocol. This is not specifically limited in this specification.

It should be noted that the system architecture shown in FIG. 3 is merely used as an example for description. In some possible implementations, the BMC can be independent of the key management system, and so on. This is not specifically limited in this specification.

Step S202: Send an encrypted second key to the storage medium, so that the storage medium decrypts the encrypted second key by using the stored first key, and stores a decrypted second key, where the second key is stored in volatile storage space of the storage medium, and the second key is used to encrypt data when the data is written into the storage medium, and decrypt data when the data is read from the storage medium.

Further, in a shown implementation, after the security hardware encrypts the generated second key by using the first key stored in the security hardware, the security hardware can send the encrypted second key to the storage medium. Correspondingly, the storage medium receives the encrypted second key.

It can be understood that a communication link (for example, an IIC link) between the security hardware and the storage medium may be intercepted by other malware. Therefore, in this specification, the second key is encrypted by using the first key, and then transmitted. In this way, leakage of the second key can be effectively prevented, and it can be ensured that the second key can be securely transmitted to the storage medium, thereby ensuring data storage security.

Further, after receiving the encrypted second key, the storage medium can decrypt the encrypted second key by using the first key stored in the storage medium, and store the decrypted second key, that is, store plaintext of the second key. The second key can be used to encrypt data when the data is written into the storage medium, and decrypt data when the data is read from the storage medium.

For example, as shown in FIG. 3, the first key is a KEK, and the second key is a MEK. In this case, the security hardware can send a MEK obtained after encryption by using the KEK to the BMC by using the IIC communication protocol, and then the BMC further sends the encrypted MEK to the storage medium by using the IIC communication protocol. After receiving the encrypted MEK, the storage medium can decrypt the encrypted MEK by using the KEK stored in the storage medium, and store a MEK obtained after decryption.

In a shown implementation, the storage medium can include the volatile storage space, and the second key can be stored in the volatile storage space. In a shown implementation, the storage medium can be an SSD, and the volatile storage space can include a RAM. In a shown implementation, the SSD can include an SSD controller. Further, the volatile storage space can be specifically located in the SSD controller. The SSD controller is a controller chip on the SSD, and is one of core components of the SSD. The SSD controller is mainly responsible for managing data storage and access on the SSD, and controlling a read/write operation of the SSD. The SSD controller usually includes some key components such as a flash memory controller, a DRAM cache, a data processor, and an I/O interface. The flash memory controller is configured to manage a flash memory storage unit on the SSD, the DRAM cache is configured to cache data for the read/write operation of the SSD, the data processor can be configured to encode and decode data on the SSD, the I/O interface is configured to communicate with a computer or another device, and so on. Details are not described herein again.

As described above, because the MEK is stored in the RAM of the SSD controller, once the electronic device is turned off or the SSD is removed from the electronic device, the SSD is powered off, and the MEK originally stored in the RAM is lost. Only after power-on is performed again and step 201 and step 202 are performed, the SSD can obtain the MEK.

In a shown implementation, the security hardware can generate the same MEK each time after power-on is performed, and a true random number ensures uniqueness of the MEK. Correspondingly, a MEK obtained through decryption by the SSD each time after power-on is performed is consistent with that obtained before the device is turned off, so that the CPU can be started normally.

In a shown implementation, for example, in the case of system reinstallation, a MEK generated by the security hardware after power-on is performed again can be different from a previously generated MEK. This is not specifically limited in this specification.

It can be understood that the storage medium and the security hardware in the electronic device are bound to some extent. If the storage medium is removed and placed in another device, or the security hardware in the electronic device is replaced, the storage medium cannot obtain plaintext of the MEK, and therefore data in the storage medium cannot be read or written, thereby ensuring data storage security.

In some possible implementations, the security hardware can package the MEK obtained after encryption by using the KEK into a form of a data packet, and send the data packet to the storage medium. Further, the security hardware can further sign the outside of the KEK (MEK) data packet by using a private key of an asymmetric key. The private key is stored in the security hardware, and a corresponding public key can be stored in the storage medium (for example, the SSD controller). After receiving the signed KEK (MEK) data packet, the storage medium can verify the signature by using the public key, to ensure authenticity and integrity of the KEK (MEK) data packet, that is, to ensure that the KEK (MEK) is sent from the security hardware and is not tampered with.

In some possible implementations, the BMC can be further connected to an out-of-band network, and the out-of-band network can include a key management service (KMS). In this way, in this specification, the KMS can generate the second key, and the second key generated by the KMS is transmitted to the security hardware through the BMC. Then, the security hardware encrypts the second key by using the first key stored in the security hardware, and securely transmits the encrypted second key to the storage medium, and so on. This is not specifically limited in this specification.

Step S203: Control, in response to that the storage medium successfully stores the second key, the CPU to be started.

Further, the security hardware can control, in response to that the storage medium successfully stores the second key, the CPU to be started. For example, the security hardware can send the start signal to the CPU in response to that the storage medium successfully stores the second key, that is, release the CPU reset signal, to start the CPU.

Further, when or after the CPU is started, the storage medium can exchange data with the CPU. In this case, the storage medium can perform data encryption management based on the stored second key. For example, the storage medium can encrypt, by using the second key, data written into the storage medium by the CPU, and/or decrypt, by using the second key, data read from the storage medium by the CPU, and so on. This is not specifically limited in this specification.

Figure 4:
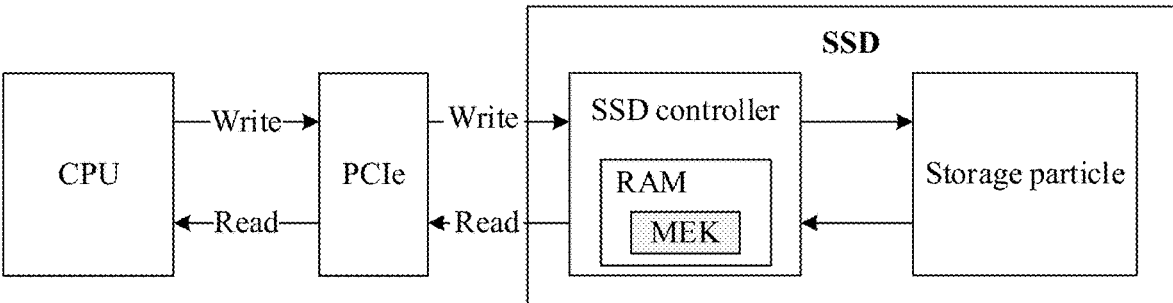
FIG. 4 is a schematic diagram of steps of data encryption management according to an example embodiment.

FIG. 4 is a schematic diagram of steps of data encryption management according to an example embodiment. As shown in FIG. 4, the SSD can communicate with the CPU through a PCIe bus. After the CPU is started, the PCIe bus starts to be powered on. For example, when running a corresponding application program, the CPU can write data into the SSD through the PCIe bus. The SSD controller can encrypt the to-be-written data by using the MEK stored in the RAM, and encrypted data can be stored in a storage particle of the SSD. In a shown implementation, the storage particle can be a NAND flash memory particle, and includes countless storage units. It should be understood that the NAND flash memory is a nonvolatile semiconductor storage device, and can still maintain stored data information in a power-off case. Details are not described herein again. Correspondingly, the CPU can read corresponding data from the storage particle of the SSD through the PCIe bus, and the SSD controller can decrypt the read data by using the MEK stored in the RAM, and transmit decrypted data to the CPU through the PCIe bus.

As described above, the second key is generated, encrypted, transmitted, decrypted, and stored before the CPU is started. Therefore, after upper-layer systems such as the BIOS and an OS and various application programs are started, they are unaware of whether the underlying storage medium is encrypted, and even for the CPU, the storage medium can be a normal hard disk without an encryption function. Therefore, in this specification, key management based on a root of trust is not only secure and reliable, but also very simple. Changes to an entire computer system are minimal, the BIOS, the OS, and the like do not need to be changed, and adaptation is excessively high.

In conclusion, the security hardware serving as the root of trust of the electronic device in this specification is mounted in the electronic device, and the security hardware is connected to the storage medium and the CPU in the electronic device. In addition, both the security chip and the storage medium store the first key. The security hardware can prevent, in response to the start instruction for the electronic device, the CPU from being started, and encrypt the second key corresponding to the security hardware by using the stored first key; and transmit the encrypted second key to the storage medium. Further, after receiving the encrypted second key, the storage medium can decrypt the encrypted second key by using the stored first key, and store the decrypted second key in the volatile storage space of the storage medium. After the storage medium successfully stores the second key, the security hardware controls the CPU to be started. Then, the storage medium can encrypt data when the data is written into the storage medium, and decrypt data when the data is read from the storage medium, by using the stored second key, to ensure data security. In this way, in this specification, an encryption key used for data encryption management is generated by using the root of trust security chip, and the encryption key is securely transmitted to the storage medium before the CPU is started, thereby implementing more secure key management and protection. In addition, because the encryption key is stored in the volatile storage space of the storage medium, once the electronic device is turned off or the storage medium is maliciously removed from the electronic device, the originally stored second key is lost as the storage medium is powered off, thereby effectively preventing key leakage and ensuring data storage security.

Figure 5:
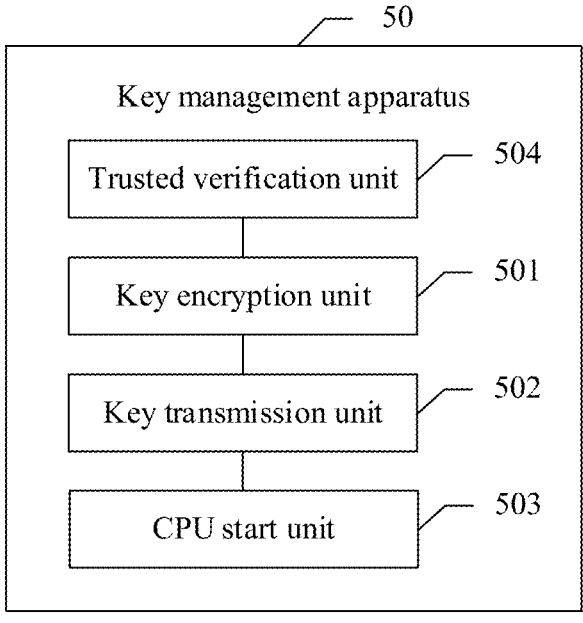
FIG. 5 is a schematic structural diagram of a key management apparatus according to an example embodiment.

Corresponding to the above-mentioned method procedure implementation, an embodiment of this specification further provides a key management apparatus. FIG. 5 is a schematic structural diagram of a key management apparatus according to an example embodiment. The apparatus 50 can be applied to security hardware that is mounted in an electronic device and that serves as a root of trust of the electronic device. The security hardware is separately connected to a storage medium and a central processing unit (CPU) in the electronic device, and the storage medium and the security hardware store a first key. As shown in FIG. 5, the apparatus 50 includes:

a key encryption unit 501, configured to prevent, in response to a start instruction for the electronic device, the CPU from being started, and encrypt a second key corresponding to the security hardware by using the stored first key;

a key transmission unit 502, configured to send an encrypted second key to the storage medium, so that the storage medium decrypts the encrypted second key by using the stored first key, and stores a decrypted second key, where the second key is stored in volatile storage space of the storage medium, and the second key is used to encrypt data when the data is written into the storage medium, and decrypt data when the data is read from the storage medium; and a CPU start unit 503, configured to control, in response to that the storage medium successfully stores the second key, the CPU to be started.

In a shown implementation, the first key is a key encryption key KEK, and the second key is a master encryption key MEK.

In a shown implementation, the key encryption unit 501 is specifically configured to: generate the second key corresponding to the security hardware, and encrypt the generated second key by using the stored first key.

In a shown implementation, the security hardware further stores the second key corresponding to the security hardware; and the key encryption unit 501 is specifically configured to:encrypt, by using the stored first key, the second key stored in the security hardware.

In a shown implementation, the second key stored in the security hardware is a key prestored in the security hardware; or the second key stored in the security hardware is a key generated and stored by the security hardware in response to the start instruction for the electronic device.

In a shown implementation, the key encryption unit 501 is specifically configured to block a sending procedure of a start signal for the CPU; and the CPU start unit 503 is specifically configured to send the start signal to the CPU.

In a shown implementation, before the sending procedure of the start signal for the CPU is blocked, the apparatus 50 further includes a trusted verification unit 504, configured to:

perform trusted verification on firmware mounted in the electronic device, and generate the start signal for the CPU in response to that the trusted verification succeeds.

In a shown implementation, the security hardware is connected to the storage medium by using a baseboard management controller BMC;

the key encryption unit 501 is specifically configured to:

receive a key obtaining request sent by the storage medium through the BMC, and in response to the request, encrypt the second key corresponding to the security hardware by using the stored first key; and the key transmission unit 502 is specifically configured to:

send the encrypted second key to the BMC, to further send the encrypted second key to the storage medium through the BMC.

In a shown implementation, the storage medium is a solid-state drive SSD.

In a shown implementation, the volatile storage space includes a random access memory RAM.

In a shown implementation, the security hardware includes any one of the following shown security chips: a security chip based on a trusted platform control module TPCM, a security chip based on a trusted platform module TPM, and a security chip based on a trusted cryptography module TCM.

Figure 6:
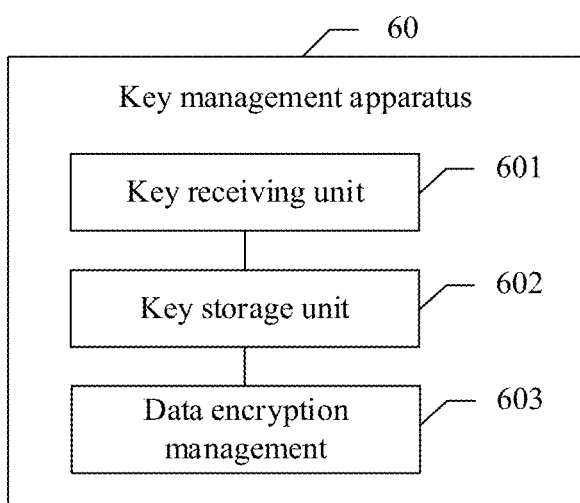
FIG. 6 is a schematic structural diagram of another key management apparatus according to an example embodiment.

Correspondingly, FIG. 6 is a schematic structural diagram of a key management apparatus according to an example embodiment. The apparatus 60 can be applied to a storage medium in an electronic device. Security hardware serving as a root of trust of the electronic device is mounted in the electronic device. The security hardware can be separately connected to the storage medium and a central processing unit (CPU) in the electronic device, and the storage medium and the security hardware store a first key. As shown in FIG. 6, the apparatus 60 includes:

a key receiving unit 601, configured to receive, after the security hardware prevents, in response to a start instruction for the electronic device, the CPU from being started, and encrypts a second key corresponding to the security hardware by using the stored first key, an encrypted second key sent by the security hardware;

a key storage unit 602, configured to decrypt the encrypted second key by using the stored first key, and store a decrypted second key, so that the security hardware controls, in response to that the storage medium successfully stores the second key, the CPU to be started, where the second key is stored in volatile storage space of the storage medium; and a data encryption management unit 603, configured to encrypt data when the data is written into the storage medium, and decrypt data when the data is read from the storage medium, by using the stored second key.

For details of implementation processes of functions and roles of the units in the apparatus 50 and the apparatus 60, refer to the descriptions in the embodiments corresponding to FIG. 1 to FIG. 4. Details are not described herein again. It should be understood that the apparatus 50 and the apparatus 60 can be implemented by software, hardware, or a combination of software and hardware. Software implementation is used as an example. As a logical apparatus, the apparatus is formed by reading corresponding computer program instructions to a memory by a processor of a device in which the apparatus is located. From a hardware perspective, in addition to the CPU and a storage, the device in which the apparatus is located usually further includes other hardware such as a chip used to send and receive wireless signals and/or other hardware such as a board used to implement a network communication function.

The apparatus embodiment described above is merely an example. The units described as separate parts may or may not be physically separate, and parts displayed as units may or may not be physical modules, may be located at one position, or may be distributed on a plurality of network modules. Some or all of the units or modules can be selected based on actual needs to achieve the objectives of the solutions of this specification. A person of ordinary skill in the art can understand and implement the solutions without creative efforts.

The apparatus, unit, and module illustrated in the above-mentioned embodiments can be specifically implemented by a computer chip or an entity, or can be implemented by a product with a certain function. A typical implementation device is a computer, and a specific form of the computer can be a personal computer, a laptop computer, a cellular phone, a camera phone, a smartphone, a personal digital assistant, a media player, a navigation device, an email receiving/sending device, a game console, a tablet computer, a wearable device, an in-vehicle computer, or a combination of any several of these devices.

Figure 7:
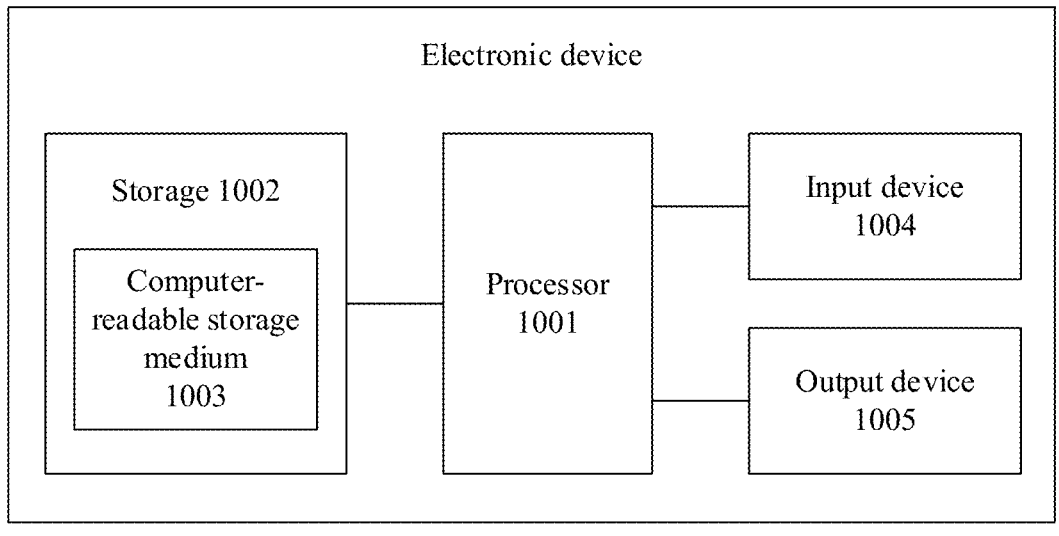
FIG. 7 is a schematic structural diagram of an electronic device according to an example embodiment.

Corresponding to the above-mentioned method embodiment, an embodiment of this specification further provides an electronic device. FIG. 7 is a schematic structural diagram of an electronic device according to an example embodiment. The electronic device shown in FIG. 7 can be the electronic device 10 shown in FIG. 1 or FIG. 3. Security hardware serving as a root of trust of the electronic device is mounted in the electronic device. The security hardware is separately connected to a storage medium and a CPU in the electronic device, and the storage medium and the security hardware store a first key. The electronic device can be specifically a smartphone, a smart wearable device, a tablet computer, a notebook computer, a desktop computer, a server, a server cluster, or the like. This is not specifically limited in this specification. As shown in FIG. 7, the electronic device includes a processor 1001 and a storage 1002, and can further include an input device 1004 (for example, a keyboard or the like) and an output device 1005 (for example, a display or the like). The processor 1001, the storage 1002, the input device 1004, and the output device 1005 can be connected through a bus or in another manner. As shown in FIG. 7, the storage 1002 includes a computer-readable storage medium 1003, and the computer-readable storage medium 1003 stores a computer program that can be run by the processor 1001. The processor 1001 can be a CPU, a microprocessor, or an integrated circuit configured to control execution of the above-mentioned method embodiment. The processor 1001 can be a processor in the security hardware. When running the stored computer program, the processor 1001 can perform the steps of the key management method in the embodiments of this specification, including: preventing, in response to a start instruction for the electronic device, the CPU from being started, and encrypting a second key corresponding to the security hardware by using the stored first key; sending an encrypted second key to the storage medium, so that the storage medium decrypts the encrypted second key by using the stored first key, and stores a decrypted second key, where the second key is stored in volatile storage space of the storage medium, and the second key is used to encrypt data when the data is written into the storage medium, and decrypt data when the data is read from the storage medium; and controlling, in response to that the storage medium successfully stores the second key, the CPU to be started, and the like.

For detailed descriptions of the steps of the key management method, refer to the above-mentioned content. Details are not described herein again.

Corresponding to the above-mentioned method embodiment, an embodiment of this specification further provides a non-transitory computer-readable storage medium. The storage medium stores a computer program, and when the computer program is run by a processor, the steps of the key management method in the embodiments of this specification are performed. For details, refer to the descriptions in the embodiments corresponding to FIG. 1 to FIG. 4. Details are not described herein again.

The above-mentioned descriptions are merely example embodiments of this specification, but are not intended to limit this specification. Any modification, equivalent replacement, improvement, and the like made without departing from the spirit and principle of this specification shall fall within the protection scope of this specification.

In a typical configuration, a terminal device includes one or more CPUs, input/output interfaces, network interfaces, and memories.

The memory may include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, removable and non-removable media that can store information by using any method or technology. The information can be computer-readable instructions, a data structure, a program module, or other data.

Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. Based on the definition in this specification, the computer-readable medium does not include transitory media such as a modulated data signal and carrier.

It should be further noted that the terms "include", "comprise", or any other variants thereof are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . ." does not preclude the presence of additional identical elements in the process, method, product, or device that includes the element.

A person skilled in the art should understand that the embodiments of this specification can be provided as methods, systems, or computer program products. Therefore, the embodiments of this specification can use a form of hardware only embodiments, software only embodiments, or embodiments with a combination of software and hardware. In addition, the embodiments of this specification can use a form of a computer program product that is implemented on one or more computer-usable storage media (including but not limited to a disk storage, a CD-ROM, an optical storage, or the like) that include computer-usable program code.

The invention claimed is:

1. A key management method, applied to security hardware that is mounted in an electronic device and that serves as a root of trust of the electronic device, wherein the security hardware is separately connected to a storage medium and a central processing unit (CPU) in the electronic device, and the storage medium and the security hardware store a first key; and the method comprises:

receiving a start instruction for the electronic device;

preventing, in response to the start instruction for the electronic device, the CPU from being started, and encrypting a second key corresponding to the security hardware by using the stored first key to generate an encrypted second key;

sending the encrypted second key to the storage medium, so that the storage medium decrypts the encrypted second key by using the stored first key to generate a decrypted second key, and stores the decrypted second key, wherein the decrypted second key is stored in volatile storage space of the storage medium, and the decrypted second key is used to encrypt data in a first case where the data is written into the storage medium, and decrypt data in a second case where the data is read from the storage medium; and controlling, in response to the storage medium successfully storing the second key, the CPU to be started.

2. The method according to claim 1, wherein encrypting the second key corresponding to the security hardware by using the stored first key comprises:

generating the second key corresponding to the security hardware, and encrypting the generated second key by using the stored first key.

3. The method according to claim 1, wherein the security hardware further stores the second key corresponding to the security hardware; and encrypting the second key corresponding to the security hardware by using the stored first key comprises:

encrypting, by using the stored first key, the second key stored in the security hardware.

4. The method according to claim 3, wherein the second key stored in the security hardware is a prestored key in the security hardware; or the second key stored in the security hardware is a generated key and stored by the security hardware in response to the start instruction for the electronic device.

5. The method according to claim 1, wherein the first key is a key encryption key (KEK), and the second key is a master encryption key (MEK).

6. The method according to claim 1, wherein preventing the CPU from being started comprises: blocking a sending procedure of a start signal for the CPU; and controlling the CPU to be started comprises: sending the start signal to the CPU.

7. The method according to claim 6, wherein before blocking the sending procedure of the start signal for the CPU, the method further comprises:

performing trusted verification on firmware mounted in the electronic device, and generating the start signal for the CPU in response to that the trusted verification succeeds.

8. The method according to claim 1, wherein the security hardware is connected to the storage medium by a baseboard management controller (BMC);

encrypting the second key corresponding to the security hardware by using the stored first key comprises:

receiving a key obtaining request sent by the storage medium via the BMC, and in response to the key obtaining request, encrypting the second key corresponding to the security hardware by using the stored first key; and sending the encrypted second key to the storage medium comprises:

sending the encrypted second key to the BMC, to further send the encrypted second key to the storage medium via the BMC.

9. The method according to claim 1, wherein the storage medium is a solid-state drive (SSD).

10. The method according to claim 1, wherein the volatile storage space comprises a random access memory (RAM).

11. The method according to claim 1, wherein the security hardware comprises any one of: a first security chip based on a trusted platform control module (TPCM), a second security chip based on a trusted platform module (TPM), or a third security chip based on a trusted cryptography module (TCM).

12. A key management method, applied to a storage medium in an electronic device, wherein security hardware serving as a root of trust of the electronic device is mounted in the electronic device, the security hardware is separately connected to the storage medium and a central processing unit (CPU) in the electronic device, and the storage medium and the security hardware store a first key; and the method comprises:

receiving a start instruction for the electronic device;

receiving, after the security hardware prevents, in response to the start instruction for the electronic device, the CPU from being started, and encrypts a second key corresponding to the security hardware by using the stored first key to generate an encrypted second key, the encrypted second key sent by the security hardware;

decrypting the encrypted second key by using the stored first key to generate a decrypted second key, and storing the decrypted second key, so that the security hardware controls, in response to the storage medium successfully storing the second key, the CPU to be started, wherein the decrypted second key is stored in volatile storage space of the storage medium; and encrypting data in a first case where the data is written into the storage medium, and decrypting data in a second case where the data is read from the storage medium, by using the stored second key.

13. A key management system, wherein the system comprises a storage medium in an electronic device and security hardware serving as a root of trust of the electronic device, the security hardware is separately connected to the storage medium and a central processing unit (CPU) in the electronic device, and the storage medium and the security hardware store a first key;

the security hardware is configured to: receive a start instruction for the electronic device;

the security hardware is configured to: prevent, in response to the start instruction for the electronic device, the CPU from being started, and encrypt a second key corresponding to the security hardware by using the stored first key to generate an encrypted second key; and send the encrypted second key to the storage medium;

the storage medium is configured to: decrypt the encrypted second key by using the stored first key to generate a decrypted second key, and store the decrypted second key, wherein the decrypted second key is stored in volatile storage space of the storage medium;

the security hardware is further configured to: control, in response to the storage medium successfully storing the second key, the CPU to be started; and the storage medium is further configured to: encrypt data in a first case where the data is written into the storage medium, and decrypt data in a second case where the data is read from the storage medium, by using the stored second key.

14. An electronic device, comprising a memory and a processor, wherein the memory stores a computer program capable of being run by the processor, and when the processor runs the computer program, the method according to claim 1 is performed.

15. The electronic device according to claim 14, wherein the electronic device being caused to encrypt the second key corresponding to the security hardware by using the stored first key includes being caused to:

generate the second key corresponding to the security hardware, and encrypt the generated second key by using the stored first key.

16. The electronic device according to claim 14, wherein the security hardware further stores the second key corresponding to the security hardware; and the electronic device being caused to encrypt the second key corresponding to the security hardware by using the stored first key includes being caused to:

encrypt, by using the stored first key, the second key stored in the security hardware.

17. The electronic device according to claim 16, wherein the second key stored in the security hardware is a prestored key in the security hardware; or the second key stored in the security hardware is a generated key and stored by the security hardware in response to the start instruction for the electronic device.

18. The electronic device according to claim 14, wherein the first key is a key encryption key (KEK), and the second key is a master encryption key (MEK).

19. The electronic device according to claim 14, wherein the electronic device being caused to prevent the CPU from being started includes being caused to: block a sending procedure of a start signal for the CPU; and the electronic device being caused to control the CPU to be started includes being caused to send the start signal to the CPU.

20. A non-transitory computer-readable storage medium, wherein the non-transitory computer-readable storage medium stores a computer program, and when the computer program is executed by a processor, the method according to claim 1 is performed.

\* \* \* \* \*